(12) United States Patent
Goetheer et al.

(10) Patent No.: US 12,168,606 B2
(45) Date of Patent: Dec. 17, 2024

(54) USE OF MOLTEN SALT TO SEPARATE CARBON FROM A MOLTEN METAL CATALYST

(71) Applicant: Nederlandse Organisatie voor toegepast-natuurwetenschappelijk Onderzoek TNO, The Hague (NL)

(72) Inventors: Earl Lawrence Vincent Goetheer, The Hague (NL); Rajat Bhardwaj, The Hague (NL); Cornelis Petrus Marcus Roelands, The Hague (NL); Marco Johannes Gerardus Linders, The Hague (NL)

(73) Assignee: Nederlandse Organisatie voor toegepast-natuurwetenschappelijk Onderzoek TNO, The Hague (NL)

( * ) Notice: Subject to any disclaimer, the term of this patent is extended or adjusted under 35 U.S.C. 154(b) by 672 days.

(21) Appl. No.: 17/428,301

(22) PCT Filed: Feb. 5, 2020

(86) PCT No.: PCT/EP2020/052879
§ 371 (c)(1),
(2) Date: Aug. 4, 2021

(87) PCT Pub. No.: WO2020/161192
PCT Pub. Date: Aug. 13, 2020

(65) Prior Publication Data
US 2022/0119259 A1    Apr. 21, 2022

(30) Foreign Application Priority Data

Feb. 5, 2019    (EP) .................................... 19155600

(51) Int. Cl.
*C01B 32/05*    (2017.01)
*B01D 53/047*   (2006.01)
(Continued)

(52) U.S. Cl.
CPC ............ *C01B 32/05* (2017.08); *B01D 53/047* (2013.01); *B01D 71/02* (2013.01);
(Continued)

(58) Field of Classification Search
CPC .. C01B 32/05; C01B 3/26; C01B 3/56; C01B 2203/0277; C01B 2203/048;
(Continued)

(56) References Cited

U.S. PATENT DOCUMENTS 5,298,233 A    3/1994 Nagel
2017/0217772 A1   8/2017 Stiller

FOREIGN PATENT DOCUMENTS

WO      85/00618        2/1985
WO    WO 2019/099795  *  5/2019 ............... B01J 8/04
WO    WO2019099795 A1    5/2019

OTHER PUBLICATIONS

Nazanin Rahimi et al: "Solid carbon production and recovery from high temperature methane pyrolysis in bubble columns containing molten metals and molten salts", CARBON., vol. 151, May 17, 2019 (May 17, 2019), pp. 181-191.
(Continued)

*Primary Examiner* — Daniel C. McCracken
(74) *Attorney, Agent, or Firm* — N.V. Nederlandsch Octrooibureau

(57) ABSTRACT

The present invention relates to a method for molten metal pyrolysis of hydrocarbons to produce hydrogen gas and carbon. Liquid salt is used to separate produced carbon from the molten metal and to facilitate isolation of produced carbon.

12 Claims, 2 Drawing Sheets

(51) Int. Cl.
  B01D 71/02 (2006.01)
  B01J 8/18 (2006.01)
  B01J 8/22 (2006.01)
  B01J 19/18 (2006.01)
  B01J 23/08 (2006.01)
  B01J 35/27 (2024.01)
  C01B 3/26 (2006.01)
  C01B 3/56 (2006.01)

(52) U.S. Cl.
  CPC ........ B01D 71/0223 (2022.08); B01J 8/1845 (2013.01); B01J 8/22 (2013.01); B01J 19/1881 (2013.01); B01J 23/08 (2013.01); B01J 35/27 (2024.01); C01B 3/26 (2013.01); C01B 3/56 (2013.01); *B01D 2257/108* (2013.01); *B01D 2257/702* (2013.01); *B01J 2208/00389* (2013.01); *C01B 2203/0277* (2013.01); *C01B 2203/048* (2013.01); *C01B 2203/0811* (2013.01); *C01B 2203/0822* (2013.01); *C01B 2203/085* (2013.01); *C01B 2203/1241* (2013.01); *C01B 2203/148* (2013.01)

(58) Field of Classification Search
  CPC ..... C01B 2203/0811; C01B 2203/0822; C01B 2203/085; C01B 2203/1241; C01B 2203/148; C01B 2203/043; C01B 2203/0465; C01B 2203/1247; B01D 53/047; B01D 71/02; B01D 71/0223; B01D 2257/108; B01D 2257/702; B01J 8/1845; B01J 8/22; B01J 19/1881; B01J 23/08; B01J 35/27; B01J 2208/00389; Y02P 20/10; Y02P 10/10

See application file for complete search history.

(56) References Cited

OTHER PUBLICATIONS

Plevan M et al: Thermal cracking of methane in a liquid metal bubble column reactor: Experiments and kinetic analysis, International Journal of Hydrogen Energy. Elsevier Science Publishers B.V Barking, GB, vol. 40, No. 25, May 8, 2015 (May 8, 2015), pp. 8020-8033.

D Chester Upham et al: "Catalytic molten metals for the direct conversion of methane to hydrogen and separable carbon", Science (New York, N.Y.), vol. 358, No. 6365, Nov. 17, 2017 (Nov. 17, 2017), pp. 917-921.

Wang et al: "Hydrogen generation by direct decomposition of hydrocarbons over molten magnesium", Journal of Molecular Catalysis A: Chemical 283 (2008), 153-157.

Ahmed et al: "Decomposition of hydrocarbons to hydrogen and carbon", Applied Catalysis A: General 359 (009), 1-24.

Munera Parra et al: Molen metal capillary reactor for the high-temperature pyrolysis of methane, International Journal of Hydrogen Energy 42 (2017), 13641-13648.

* cited by examiner

A

B

USE OF MOLTEN SALT TO SEPARATE CARBON FROM A MOLTEN METAL CATALYST

FIELD OF THE INVENTION

The present invention relates to a method for molten metal pyrolysis of hydrocarbons to produce hydrogen gas and carbon. Liquid salt is used to separate produced carbon from the molten metal and to facilitate isolation of produced carbon.

BACKGROUND ART

The invention relates to improved methods for molten metal pyrolysis of hydrocarbons, to produce hydrogen gas and solid carbon. Traditional method for producing $H_2$ from for example $CH_4$ (methane) results in massive $CO_2$ emissions. Molten metal pyrolysis has emerged recently as a new method to produce $H_2$ and solid carbon, which can reduce the overall $CO_2$ emissions for $H_2$ and carbon combined by >75%. Use of pyrolysis technology as a method for $H_2$ production has a threefold advantage. It can decrease the overall energy requirement by ~50%; there are negligible process-based $CO_2$ emissions; and the carbon produced (as solid product) is without any additional $CO_2$ emission, which therefore is significantly lower than conventional spray drying method for production of carbon ($CO_2$ footprint ~4 ton $CO_2$ per ton of produced carbon). Hydrogen and carbon are valuable products. Currently, the latter is a market at megaton scale. Generally, 1 ton (~200 euros) of methane pyrolysis generates a value of 750 euros in carbon (conservative assumption) and 375 euros in hydrogen gas when 100% conversion is assumed (literature values of 95% are reached by Upham et al., 2017 Science, 358(6365), 917-921). Overall, a margin of over a factor ten can be achieved. Thus, pyrolysis of methane has an enormous economic potential and at the same time leads to a significant $CO_2$ reduction.

Molten metal pyrolysis is known in the art. Examples of processes are given in U.S. Pat. No. 5,298,233A, Upham et al.; Wang et al., 2008, J. Mol. Cat. A, 283(1-2), 153-157; Plevan et al., 2015, Int. J. Hydrogen Energy, 40(25), 8020-8033; Ahmed et al., 2009, Applied Catalysis A, 359(1-2), 1-24; Parra & Agar, 2017, Int. J. Hydrogen Energy, 42(19), 13641-13648.

For example, Upham et al. describe catalytic molten metals for the direct conversion of methane to hydrogen and separable carbon. In general, hydrocarbons such as methane gas are fed through a layer of molten metal catalyst which cracks the methane into solid carbon and hydrogen gas. Both these species have a lower density than the molten metal, causing the products to diffuse towards the top of the liquid metal layer. The hydrogen gas evolves and can be captured, while the carbon is a solid and will accumulate floating on top of the molten metal.

A problem with known hydrogen gas formation from hydrocarbons is this accumulation of carbon. As discussed by Plevan et al., existing reactors have a high risk of an irreversible reactor blockage due to solid carbon formation. Solid carbon formation is also reported to weaken the active surface of non-carbonaceous catalysts in the reaction zone.

A problem with conventional molten metal pyrolysis processes is that isolation of the solid carbon product involves separation from molten metal. Solid carbon can complex with metal, inactivating its catalytic properties. Upham et al. suggest two methods to improve carbon isolation. The first method is to mechanically skim the carbon from the molten metal surface, a technique known from metallurgical processes, where it is used to remove slag material from melts. The second suggested method involves the use of a gas flow to blow the produced carbon away from the molten metal.

These known suggestions only relate to removal of solid carbon from the molten metal reactor and not to its separation from metal. The methods do not solve the problems caused by carbon-metal interaction. Additionally, skimming would either involve simultaneous removal of molten metal to allow all carbon to be skimmed, or it would involve incomplete carbon skimming as to not disturb the molten metal. This would either lead to gradual catalyst depletion, or to persisting carbon-metal interaction. Similarly, blowing does not address carbon-metal interaction.

U.S. Pat. No. 5,298,233 describes the use of a vitreous layer to cover a molten metal catalyst. The layer can consist of for example halogens, sulphur, phosphorus, or heavy metals. It has a poor permeability, and thus increases residence time of the carbon and the hydrogen in the molten metal catalyst. This increased residence time is to promote oxidation of carbon to a carbon oxide gas such as carbon dioxide, which can then be separated from the molten metal. Oxidation of the carbon requires a distinct molten metal catalyst in addition to the molten metal used for pyrolysis. The additional catalyst forms a second layer of molten metal, forming a multi-layered molten metal system. No solid carbon product is obtained by such methods.

There is a need for improved pyrolysis methods, preferably involving only a single layer of catalyst, preferably having reduced carbon dioxide gas emission, preferably resulting in less waste emission. There is a need for improving the output of valuable products from pyrolysis processes, or to improve the quality of such products. There is a need for improved methods of separating solid carbon from molten metal, preferably at high temperatures and/or in a continuous process.

SUMMARY OF THE INVENTION

The invention relates to the use of a molten salt to separate solid carbon from molten metal. The molten salt is immiscible with the molten metal. It has a lower density, and can therefore form a layer on top of the molten metal. The solid carbon product has an ever lower density and can thus accumulate on top of the molten salt, or it can form a mixture with the molten salt. The carbon product is thus physically separated from the molten metal. Solid carbon, together with some molten salt, is collected from the top of the molten mass in the reactor. Separation of the carbon product from molten salt is readily achieved, e.g. by simple washing with water, which rapidly removes salt from the carbon product.

Accordingly, the invention is described according to the following list of preferred embodiment.

1. Method for producing solid carbon and hydrogen gas by molten metal pyrolysis of hydrocarbons, the method comprising:
   (i) feeding a stream of hydrocarbon into a pyrolysis reactor through a catalytic layer of molten metal to pyrolise the hydrocarbon into solid carbon and hydrogen gas;
   (ii) feeding a stream of molten salt into the pyrolysis reactor to separate the solid carbon from the molten metal.
   (iii) collecting a product gas containing hydrogen gas that evolves from the reactor;

(iv) collecting a mixture comprising solid carbon and molten salt;

(v) separating the mixture obtained in step (iv) into a product comprising solid carbon and separated salt.

2. The method according to embodiment 1, wherein the metal in the molten metal is selected from the group consisting of In, Bi, Sn, Ga, Pb, Ag, Cu, Sn, Pt, Ni, and Au.

3. The method according to embodiment 1 or 2, wherein the salt has a heat capacity of at most 2 J/K, more preferably at most 1.7 J/K, most preferably at most 1.6 J/K, and/or wherein the salt comprises at least one of $KNO_3$, $NaNO_3$, NaCl, KCl, LiCl, $MgCl_2$, CuCl, $NiCl_2$, $ZnCl_2$, $ZnBr_2$ and NaBr.

4. The method according to any one of embodiments 1-3, wherein the hydrocarbon comprises a $C_1$-$C_4$ hydrocarbon, preferably methane.

5. The method according to any one of embodiments 1-4, further comprising:

(vi) separating the product gas obtained in step (iii) into unconverted hydrocarbon gas and hydrogen gas, preferably using an adsorbent material, to obtain purified hydrogen gas and recovered hydrocarbon.

6. The method according to embodiment 5, wherein the recovered hydrocarbon is recycled back into the pyrolysis reactor as part of step (i).

7. The method according to any one of embodiments 1-6, wherein the reactor has an inlet for receiving the hydrocarbon at or near the bottom end of the reactor, an outlet for discharging a mixture of carbon and molten salts in a side wall, and an outlet for discharging a product gas comprising hydrogen at or near the top end.

8. The method according to any one of embodiments 1-7, wherein a layer of molten salt is present in the pyrolysis reactor, and wherein step (iv) involves skimming to collect the solid carbon and part the layer of molten salt, such that substantially all of the solid carbon is removed from the reactor.

9. The method according to any one of embodiments 1-8, wherein step (v) involves separating solid carbon from the separated salt by filtering and/or washing the mixture with an aqueous liquid, preferably using a metal filter or a ceramic filter, to obtain a product comprising pure solid carbon and a separated salt.

10. The method according to any one of embodiments 1-9, wherein the separated salt is recycled into the reactor as part of step (ii).

11. The method according to any one of embodiments 1-10, wherein the reactor is kept at a temperature in the range of 250-1500° C.

12. Reactor for performing molten metal pyrolysis of hydrocarbons (1), the reactor comprising:

(a) a vessel (5) for holding a catalytic layer of molten metal (6) and a layer of molten salt (7), (b) an inlet (4) for receiving the hydrocarbon (1) at or near the bottom end of the vessel (5), a first outlet (14) for discharging a mixture of solid carbon and molten salts in a side wall of the vessel (5), and a second outlet (9) for discharging a product gas comprising hydrogen at the top end of the vessel, (c) means (15) for separating a mixture of solid carbon and molten salts discharged from the first outlet (14); and (d) a recycle (16) for recycling molten salts from the separator (15) to the vessel (5).

13. The reactor according to embodiment 12, wherein the reactor is a bubble column reactor.

14. The reactor according to embodiment 12 or 13, wherein the reactor is heated using the hydrocarbon, the hydrogen gas, or electricity.

15. Use of molten salt for the separation of solid carbon from a molten metal.

DESCRIPTION OF EMBODIMENTS

The present invention concerns a method and a reactor, as well as several uses. The method according to the invention is preferably performed in the reactor according to the invention, and the reactor according to the invention is preferably designed to perform the process according to the invention. Thus, anything described here below for the reactor also applies to the method and the uses, and anything described here below for the method also applies to the reactor and the uses.

Method

In a first aspect, the invention provides a method for producing solid carbon and hydrogen gas by molten metal pyrolysis of hydrocarbons. The method according to the invention comprises at least the following steps:

(i) feeding a stream of hydrocarbon into a pyrolysis reactor through a catalytic layer of molten metal to pyrolise the hydrocarbon into solid carbon and hydrogen gas;

(ii) feeding a stream of molten salt into the pyrolysis reactor to separate the solid carbon from the molten metal;

(iii) collecting a product gas containing hydrogen gas that evolves from the reactor.

In molten metal pyrolysis of hydrocarbons, the hydrocarbons are fed through a layer of molten metal catalyst which cracks the hydrocarbon into solid carbon and hydrogen gas. Both these species have a lower density than the molten metal, causing the products to diffuse towards the top of the liquid metal layer. Solid carbon as produced by the method according to the invention is referred to hereinafter as produced carbon. Produced carbon is typically in particulate form, such as having a particle size of at most 500 µm, preferably with a particle size of at most 200 µm, most preferably as at most 100 µm. It can be in any form, including any mixture of forms, but is typically glassy carbon, diamond-like carbon, crystalline carbon, paracrystalline carbon, or amorphous carbon, more preferably crystalline carbon, paracrystalline carbon, or amorphous carbon, most preferably crystalline or paracrystalline carbon is formed. Examples of paracrystalline carbon is carbon black. Suitable examples of crystalline carbon are graphite, graphene, fullerenes, nanotubes, and glassy carbon. Carbon black is a preferred paracrystalline carbon, graphite is a preferred crystalline carbon. It is known in the art that control of the temperature at which pyrolysis takes place and selection of metal catalyst steers the form of carbon that is obtained (see Muradov et al. *Int. J. Hydrogen,* 2005, 30:225). For example, varying the temperature within the range 500-1300° C. could give carbon filaments, turbostatic carbon, graphitic carbon and amorphous carbon Such steering of the reaction product is perfectly compatible with the present invention, such that any type of carbon can be obtained by the method according to the invention.

Produced carbon can be used as is, or it can be treated further, for example through oxidation to produce carbon oxides, which can subsequently be used in the production of alcohols such as methanol. In preferred embodiments, the produced carbon is oxidised or partially oxidised in a separate reactor, preferably to be used in further chemical production.

Hydrogen gas as produced by a method according to the invention may also be referred to as produced hydrogen gas. It is a highly combustible diatomic gas.

The steps of the method can be performed in any order, or sequentially, or simultaneously, as will be clear to a skilled person. The steps of the method are preferably performed simultaneously, and the method operates (semi-)continuously.

Step (i)

In step (i) a stream of hydrocarbon is fed into a pyrolysis reactor through a catalytic layer of molten metal to pyrolise the hydrocarbon into solid carbon and hydrogen gas. The stream of hydrocarbon is preferably fed continuously. It is convenient to feed the hydrocarbon into the bottom or near the bottom of a reactor, so that it can travel a long path through the catalytic layer. Hydrocarbons are well-known, as is their use in molten metal pyrolysis. The hydrocarbon can be a mixture of multiple species of hydrocarbon. In the method according to the invention, the hydrocarbon is preferably a hydrocarbon gas. In preferred embodiments, the hydrocarbon comprises a $C_1$-$C_4$ hydrocarbon, preferably a $C_1$-$C_4$ alkane, more preferably methane and/or ethane, most preferably methane. Preferred sources of the hydrocarbons are natural gas, syngas, methane, but also fuel gases, refinery gases and other industrial gases comprising hydrocarbons can be used. Highly preferred sources of the hydrocarbons are natural gas, syngas and methane, more preferably natural gas or methane. The hydrocarbon feed may further comprise inert carrier gases, such as argon. Such a carrier gas does not affect to pyrolysis reaction but facilitate the upward movement of the products of the pyrolysis reaction to the top of the molten mass. However, since one mole of methane (or less in case a larger hydrocarbon is used) is converted into two moles of hydrogen gas, the associated increase in volume ensures enough upward movement without the need of a carrier gas. The presence of oxygen is preferably avoided as much as possible, as oxygen may lead to combustion of components (hydrocarbon or hydrogen) in the reactor at pyrolysis conditions. Also the presence of nitrogen is preferably avoided, as that may lead to the formation of ammonia at pyrolysis conditions, which will pollute the gaseous product. Thus, in a preferred embodiment, the process further comprises the removal of oxygen from the feed if needed, more preferably oxygen and nitrogen are removed if needed. Alternatively worded, the feed is preferably substantially free from oxygen, more preferably substantially free from oxygen and nitrogen. The present process is able to deal with $CO_2$ and $H_2S$ impurities. Thus, in one embodiment, the hydrocarbon feed may further contain $H_2S$. Thus, in another embodiment, the hydrocarbon feed may further contain $CO_2$, or even $H_2S$ and $CO_2$.

A pyrolysis reactor is a reactor suitable for containing a molten metal catalyst. Such reactors are known in the art, and are described in more detail later herein. A preferred reactor is a reactor according to the invention as described later herein. In a preferred embodiment, the reactor has an inlet for receiving the hydrocarbon at or near the bottom end of the reactor, an outlet for discharging a mixture of carbon and molten salts in a side wall, and an outlet for discharging a product gas comprising hydrogen at or near the top end. Step (ii) typically involves bubbling of the hydrocarbon feed though the molten metal. In a preferred embodiment, the diameter of the bubbles is in the range of 0.1-1000 μm, more preferably in the range of 1-500 μm, most preferably in the range of 10-100 μm. The inventors found that such relatively small bubble sizes improved the hydrodynamics and the productivity of the process.

Pyrolysis takes place inside the reactor. Pyrolysis is the thermal decomposition of materials, in this case of the hydrocarbon, at elevated temperatures, preferably in an inert atmosphere. A skilled person will know how to implement pyrolysis, for example by using argon to create an inert atmosphere, or by configuring the stream of hydrocarbon to spurge the reactor, leading to an inert atmosphere.

Preferably the reactor is kept at a temperature in the range of 200-2000° C., more preferably in the range of 250-1500° C., most preferably in the range of 300-1500° C. The reactor can have more than one temperature zones, such as a reaction temperature zone in which the reaction takes place, and a separation temperature zone in which a layer of molten salt can be present. The reaction temperature zone contains the molten metal. Preferably, the reaction temperature zone has a temperature in the range of 700-2000° C., more preferably in the range of 800-1500° C., most preferably in the range of 900-1100° C. The reaction zone can have different temperatures, to allow thermal cracking at different temperatures. This variability allows adjustment of the quality of produced carbon. The skilled person is capable of adjusting the temperature in the reaction zone in order to optimize the pyrolysis reaction.

The separation temperature zone contains molten salt. Preferably, the separation temperature zone has a temperature in the range of 200-1500° C., more preferably in the range of 200-1000° C., most preferably in the range of 250-800° C. In preferred embodiments, the separation temperature zone has a temperature that is lower than the reaction temperature zone; this can aid in preserving the molten metal layer by trapping any evaporating metal in a molten salt layer.

The catalytic layer of molten metal is a liquid phase wherein pyrolysis takes place. Conveniently, the molten metal can ensure that the hydrocarbon is in an inert atmosphere and thus susceptible to pyrolysis, obviating the need for a further inert gas. Therefore, preferred hydrocarbon are free or substantially free of oxygen. The layer of molten metal can be a layer of pure metal, that is of a single species of metal. In this case the metal should be a catalytic metal capable of catalysing the pyrolysis. Metallic catalysts (e.g., Mg, Ni, Pd, Pt) achieve high conversion and selectivity to $H_2$ at moderate temperatures; however, their melting temperatures are extremely high and as solids, they are rapidly deactivated by solid carbon (coke). In preferred embodiments, the metal in the molten metal is selected from the group consisting of Mg, Pd, In, Bi, Sn, Ga, Pb, Ag, Cu, Sn, Pt, Ni, and Au, more preferably selected from the group consisting of In Bi, Sn, and Ga, most preferably Ga.

The layer of molten metal can also comprise more than one species of metal, thus essentially being a molten alloy. Such liquid alloys preferably comprise catalytically active metals dissolved in low-melting-temperature metal such as Sn, Pb, Bi, In, or Ga. Known equilibrium phase behaviour can be used to produce catalysts that melt at or below 2000° C., preferably 1500° C., more preferably 1100° C. or 1000° C. Preferred alloys are Cu—Sn, Pt—Sn, Pt—Bi, Ni—In, Ni—Sn, Ni—Ga, Ni—Pb, and Ni—Bi. Highly preferred alloys comprise Ni as catalytic metal. Highly preferred alloys comprise Sn, Pb, Ga, or Bi as low-melting-temperature metal, more preferably Sn or Bi. Catalytically active metal is preferably present at at most 50 mol % of the alloy, more preferably at most 35 mol %, most preferably at about 25-30 mol %, such as 27 mol %. Catalytically active metal is preferably present at at least 5 mol % of the alloy, more preferably at least 10 mol %, even more preferably at least 15 mol %. Catalytically active metal is preferably atomically dispersed.

In preferred embodiments the stream of hydrocarbon is fed into the pyrolysis reactor at a rate close to the maximum catalytic capacity of the molten metal catalyst or higher, preferably the rate of feeding is at least 90% (by mole per second) of the catalytic capacity of the molten metal. In preferred embodiments the stream of hydrocarbon is fed into the pyrolysis reactor at a rate exceeding the catalytic capacity of the molten metal catalyst, preferably by at least 10% or even at least 50%.

Step (ii)

In step (ii) a stream of molten salt is fed into the pyrolysis reactor to separate the solid carbon from the molten metal. The molten salt is preferably fed in a continuous process. The molten salt has a lower density than the molten metal, and therefore it can form a layer of molten salt on top of the layer of molten metal. This aids in physically separating the produced carbon from the molten metal, because the produced carbon has lower density than the liquid metal and the liquid salt, so it will float on top of the combined system. Furthermore, the presence of molten salt in the catalytic layer of molten metal is found not the affect the catalytic capacity of the molten metal.

Accordingly, in preferred embodiments step (ii) involves the formation of a layer of molten salt which has a lower density than the layer of molten metal. More preferably step (ii) involves the replenishment of a layer of molten salt, for example when a layer of molten salt is removed from the reactor as part of the method. Most preferably, as described later herein, a layer of molten salt is present in the reactor, which is continuously collected and which is replenished by the stream of molten salt of step (ii).

The stream of molten salt can be fed into the pyrolysis reactor below or in the layer of molten metal, so that the molten salt moves upwards through the layer of molten metal to form a layer of molten salt on top of the molten metal. As such, the upward movement of the molten salt agitates the molten metal. This facilitates diffusion of produced carbon, promoting its accumulation in or on the molten salt layer. The stream of molten salt can also be fed above or in the layer of molten salt to minimize temperature loss when the molten salt is at a lower temperature than the molten metal. The stream of molten salt can also be fed into the pyrolysis reactor in a single batch, to form a layer of molten salt that is not removed or replenished in a continuous fashion.

A single salt or a mixture of salts can be fed in step (ii). Preferred salts are metal salts, such as metal halides, metal carbonates, metal nitrates and metal sulphates. The salt preferably comprises a metal selected from Li, Mg, Zn, Cu, Ni, Na and K, preferably selected from Li, Mg, Zn, Na and K, preferably the salt comprises Na or K. Alternatively, the metal may be selected from Mg, Zn, Cu, Ni, Na and K, and preferably is selected from Mg and Zn. Preferred anions are small anions, preferably monoatomic anions or inorganic anions having preferably at most 7, 5, or 4 atoms, for example comprising Cl or $NO_3$. Preferred salts are selected from the group consisting of $KNO_3$, $NaNO_3$, NaCl, KCl, LiCl, $MgCl_2$, $CuCl$, $NiCl_2$, $ZnCl_2$, $ZnBr_2$ and NaBr, more preferably selected from the group consisting of $KNO_3$, $NaNO_3$, NaCl, KCl, LiCl, $MgCl_2$, $ZnCl_2$, $ZnBr_2$ and NaBr. An alternative list of preferred salts is selected from KCl, $MgCl_2$, $CuCl$, $NiCl_2$, $ZnCl_2$ and NaBr. These salts were found to have advantageous properties in terms of density and wettability. These salts have been tested in the process according to the invention, and no metal was found in the carbon product, which is indicative of perfect separation of metal and carbon by the layer of molten salts. Especially preferred are $MgCl_2$ and $NiCl_2$. Preferred mixtures of salt are $KNO_3$ and $NaNO_3$, NaCl and KCl, KCl and $KNO_3$, NaCl and $NaNO_3$. Mixtures of salts comprising two species of salts preferably comprise those species in a weight ratio in the range of 40:60-60:40, more preferably at about 50:50. Possibly, an eutectic mixture of salts is used, which melt at a lower temperature then the individual salts.

In one embodiment, the salt is selected based on its stability and heat capacity. As the skilled person will understand, the molten salt should be stable at the temperature and conditions (such as presence of $H_2$) within the reactor. Further, it is convenient to use a salt with a low heat capacity, to reduce energy requirements in its melting or heating. Preferred molten salts melt reversibly. In this context, a salt is considered stable at a temperature when after 1 hour at that temperature at most 10%, more preferably at most 2%, most preferably at most 0.1% of the salt has decomposed. Assays for salt stability are widely known, for example the stability of nitrate ions can be assayed using the nitrate reductase enzymatic assay. In a preferred embodiment, the salt has a heat capacity of at most 2 J/K, more preferably at most 1.7 J/K, most preferably at most 1.6 J/K. Preferred salts or mixtures of salts are liquid at about 1000° C. Preferred salts or mixtures of salts have a melting point above 90° C., preferably above 150° C., more preferably above 250° C., or even above 400° C. Most preferably, the melting temperature is above 500° C.

The molten salt separates the produced carbon from the catalytic layer of molten metal and promotes dissociation between the molten metal and the produced carbon, and it can trap evaporated or evaporating metal to allow its reuptake in the molten metal layer. Thus the molten salt protects the catalytic layer of molten metal, in that it helps maintain its catalytic ability or prevents deterioration of its catalytic ability. Thus the layer of molten salt can act as a protecting layer. In preferred embodiments the carbon product has a higher affinity for the molten salt than for the molten metal. In some embodiments the method according to the invention, wherein the protecting layer has a solubility for hydrogen gas which is at least substantially equal to that of the catalytic layer, preferably wherein the protecting layer has a higher solubility for hydrogen gas than the catalytic layer.

Step (iii)

In step (iii) a product gas containing hydrogen gas that evolves from the reactor is collected. The product gas is the gas that evolves from the molten metal layer and has passed through the molten salt layer. It can be pure or substantially pure hydrogen gas, but it can also comprise unconverted hydrocarbon gas and possibly minor amounts or intermediate or by-products. Preferably the product gas does not comprise $CO_2$. The collected product gas can be used in further applications, for example as a fuel source or for the formation of valuable compounds.

Preferably, the product gas is treated further. In preferred embodiments the method according to the invention further comprises separating the product gas obtained in step (iii) into unconverted hydrocarbon gas and hydrogen gas, to obtain purified hydrogen gas and recovered hydrocarbon. Separation of gases is known in the art, and a skilled person can select suitable methods for separation of hydrogen gas from unconverted hydrocarbon gas. Suitable techniques include cryogenic distillation or an adsorption to a sorbent, wherein use of a sorbent is preferred. Examples of sorbent materials are zeolites, metal-organic frameworks, activated carbon, and molecular sieves, preferably zeolites, metal-organic frameworks, and molecular sieves, most preferably zeolites. A highly preferred technique is pressure swing adsorption (PSA) wherein adsorbent material is used as a trap that at high pressure preferentially adsorbs either $H_2$ or the unconverted hydrocarbon, after which low pressure is used to desorb the adsorbed gas. The purified hydrogen gas is preferably at least 90% pure, more preferably at least 95%, even more preferably at least 98%, most preferably at least 99% pure, such as 99.9% pure or essentially pure.

The recovered hydrocarbon gas can be used for any application. Conveniently it is reused in the method according to the invention. In preferred embodiments, the method according to the invention is provided, wherein the recovered hydrocarbon is recycled back into the pyrolysis reactor as part of step (i). The recovered hydrocarbon can be fed into the stream of hydrocarbon of step (i) before it enters the pyrolysis reactor, or it can be separately fed into the pyrolysis reactor. Preferably the recovered hydrocarbon is fed into the stream of hydrocarbon of step (i).

Step (iv)

The method according the invention typically further comprises step (iv) wherein solid carbon is collected, preferably as a mixture with molten salt. The solid carbon that is collected is the produced carbon resulting from the pyrolysis of the hydrocarbon. As a result of this collection step, produced carbon is removed from the reactor.

Typically, a mixture comprising produced carbon and molten salt is collected. This has the advantage of allowing convenient collection of substantially all of the produced carbon without also removing molten metal from the reactor, because the carbon is physically separated from the metal catalyst by the molten salt layer. In this context the molten salt can be considered sacrificial, in that it is removed together with the produced carbon to prevent undesired removal of molten metal. As such, the molten salt layer is preferably replenished as part of step (ii).

In preferred embodiments, a layer of molten salt is present in the pyrolysis reactor, and step (iv) involves skimming to collect the produced carbon and part the layer of molten salt, such that substantially all of the produced carbon is removed from the reactor. Preferably, no molten metal is collected as part of the skimming. Accordingly, the layer of molten salt is preferably configured to have a height that is sufficient to allow skimming of its surface without said skimming interfering with the underlying layer of molten metal. Typically, about 10-60% of the total height of the layer of molten salt is removed during step (iv), preferably 25-55% of the total height is removed. In this context, removal of the produced carbon refers to the removal of the solid carbon that has accumulated on top of the layer of molten salt. Skimming can be performed using any skimmer known in the art, as long as the skimmer is suitable for use at temperatures required for the method according to the invention. Suitable skimmers are for example disclosed in U.S. Pat. No. 4,191,559 and in WO 2010/061022.

Step (v)

When a mixture is obtained in step (iv), it can be used as deemed fit, preferably by further treatment to obtain pure solid carbon. Accordingly, the method according to the invention preferably further comprises step (v) wherein the mixture obtained in step (iv) is separated into a product comprising solid carbon and separated salt.

The product comprises the produced carbon and is preferably pure or substantially pure carbon. In this context, the carbon content of the produced carbon is preferably at least 90%, more preferably at least 95%, even more preferably at least 99%, or even higher. This pure carbon can be used as is, or can be subjected to further treatment, such as even further purification or conversion into carbon-containing compounds.

In a preferred embodiments, the separation of step (v) is achieved by filtering the mixture of molten salt and produced carbon obtained in step (iv) through a filter. Molten salt is recovered as permeate and can be used as deemed fit. Preferably, it is recycled into the reactor. It can be fed into the reactor as a separate stream, but preferably it is fed into the stream of molten salt of step (ii). The solid carbon product is obtained as retentate. The retentate may still contain traces of molten salt that adhere to the carbon particles. Such last traces of salt may be removed from the produced carbon, e.g. by washing. Accordingly, step (v) preferably involves separating solid carbon from the separated salt by filtering and/or washing the mixture with an aqueous liquid, using a filter such as a metal filter or a ceramic filter, to obtain a product comprising solid carbon and recovered salt, as permeate and/or dissolved in the washing liquid. Any solvent (or mixture) can be used as washing liquid, as long as the salt dissolves therein. The skilled person is able to select an appropriate washing liquid in which the salt that is used dissolves. Preferably, the washing liquid is water, although ethers and alcohols can in some instances also be useful.

The separated salt can be used in further applications, or it can be recycled into the method according to the invention. In preferred embodiments, the molten salt is recovered and recycled into the reactor as part of step (ii).

Filters suitable for use in step (v) are filters that can be used at the temperatures of the method according to the invention, in particular the temperature at which separation occurs. Suitable filters are metal membranes or ceramic membranes, preferably ceramic membranes. The filter preferably has a pore size suitable for retaining the solid carbon particles. The filter preferably has a pore size that is sufficiently large to allow expedient permeation of the molten salt, or of the aqueous liquid comprising dissolved separated salt. The pore size can depend on the size of the produced carbon particles. A skilled person can select a suitable filter. Preferred filters have a pore size of at most 500 μm, preferably of at most 100 μm, more preferably of at most 10 μm, most preferably of at most 1 μm. In a preferred embodiment, the pore size is in the range of 0.5-500 μm.

In a highly preferred embodiment, the method according to the invention comprises:
(i) feeding a stream of hydrocarbon into a pyrolysis reactor through a catalytic layer of molten metal to pyrolise the hydrocarbon into solid carbon and hydrogen gas;
(ii) feeding a stream of molten salt into the pyrolysis reactor to separate the solid carbon from the molten metal;
(iii) collecting a product gas containing hydrogen gas that evolves from the reactor;
(iv) collecting a mixture comprising solid carbon and molten salt;
(v) separating the mixture obtained in step (iv) into a product comprising solid carbon and separated salt.

Even more preferably, in step (iv) the mixture is collected by skimming, and in step (v) the separation mixture is separated by a filter to obtain separated salt as permeate, which is preferably recycled into the reactor, and to obtain produced solid carbon. Even more preferably this solid carbon is then washed with an aqueous solution, preferably water, and is subsequently dried. Most preferably the aqueous solution comprising the salts that were dissolved during washing is evaporated to produce recovered salt that is also recycled in step (ii).

Reactor

Reference is made to FIG. 2. In another aspect the invention provides a reactor for performing molten metal pyrolysis of hydrocarbons (1). The reactor according to the invention comprises:

(a) a vessel (5) for holding a catalytic layer of molten metal (6) and a layer of molten salt (7), (b) an inlet (4) for receiving the hydrocarbon (1) at or near the bottom end of the vessel (5), a first outlet (14) for discharging a mixture of solid carbon and molten salts in a side wall of the vessel (5), and a second outlet (9) for discharging a product gas comprising hydrogen at the top end of the vessel;

(c) means (15) for separating a mixture of solid carbon and molten salts discharged from the first outlet (14); and (d) a recycle (16) for recycling molten salts from the separator (15) to the vessel (5).

The reactor according to the invention is configured for molten metal pyrolysis of hydrocarbons using a method according to the invention, and it can be seen as a conventional molten metal pyrolysis reactor having a vessel (5) and an inlet (4) and an outlet (9) for discharging product gas, characterized in that it features an outlet (14) for discharging a mixture of carbon and salt, means (15) for separating the mixture of produced carbon and molten salts and a recycle (16) for recycling molten salts from the separator (15) to the vessel (5).

The vessel (5) can be any vessel suitable for performing molten metal pyrolysis. Suitable materials for such a vessel or for other components of the reactor according to the invention are known in the art. Preferred materials are quartz, stainless steel, and ceramics. A preferred stainless steel is SAE 304 stainless steel.

In preferred embodiments, the vessel (5) is a bubble column reactor. A bubble column reactor is a reactor in which a gas can be bubbled through liquid layers, which supports the transfer of the solid carbon from the molten metal layer to the molten salt layer. Preferred bubble columns have means for increasing the surface area of the hydrocarbon stream, such as a frit, preferably a stainless steel frit. A bubble column preferably has an aspect ratio wherein it is at least 5 times as high as it is wide, preferably at least 8 times as high as it is wide, more preferably at least 10 times as high as it is wide. Preferred ratios range from about 150:12 to about 40:1. The height and diameter of the bubble column depend on the envisaged volume of the molten metal catalyst layer and the envisaged volume of any molten salt layer. A skilled person can select a suitable bubble column. Examples of possible lengths for the longest aspect of a bubble column are 150 mm and 1100 mm. The bubble column can have any shape, such as straight, curved, U-shaped, or L-shaped. Preferably a bubble column is straight or substantially straight.

The reactor according to the invention preferably comprises means for heating. These means for heating should be suitable for achieving temperatures required for performing the method according to the invention. Preferably, a reactor according to the invention is configured to have product streams of similar temperatures be integrated near each other. The reactor according to the invention can be in an oven or furnace. Preferably, heating means are integrated in the reactor according to the invention. Preferred heating means are ovens, furnaces, heating sleeves, and heating blocks. In preferred embodiments, heating means surround the vessel (5), preferably an electric arc furnace. Heating means can be powered using an external power source such as electricity, or they can be powered using the hydrocarbon stream or part of the hydrocarbon stream, or using recovered hydrocarbon, or using product gas, or using produced hydrogen gas. In preferred embodiments is provided the reactor according to the invention, wherein the reactor is heated using the hydrocarbon, the hydrogen gas, or electricity.

A reactor according to the invention can be used in a centralized large scale systems, for example in a petrochemical complex or at an industrial site or plant. Preferably a reactor according to the invention is used as a decentral system, or as part of a decentral system, for example at a petrol station or at a hydrogen gas supply location.

In the reactor according to the invention pumps can be present. A skilled person will be able to select any suitable pump. Alternately, pressure can be generated via other means, such as pre-pressurized containers, to promote flow of streams in the reactor.

Produced hydrogen gas evolves from the molten layers and can collect in a headspace (8), along with possible unconverted hydrocarbon gas. This headspace (8) can be cooled to prevent possible reactions, oxidation of reactor components, and/or evaporation of molten salt or of molten metal. Such cooling can be done via any suitable cooling means, for example using a fan that blows in external air.

The product mixture can be collected via an outlet (9) for discharging a product gas comprising hydrogen at the top end of the reactor (5), after which it can be transport with an optional pump compressor (10) towards means (11) for separating pure hydrogen gas (12) from unconverted hydrocarbon gas (13). The recovered hydrocarbon gas can be fed into the original stream of hydrocarbon (1) for instance at a junction (3) before the stream enters the reactor (5). Means (11) for separating pure hydrogen gas from unconverted hydrocarbon have been described elsewhere herein. Preferred means comprise adsorbent materials, such as a pressure swing adsorption unit.

The reactor has an outlet (14) for discharging a mixture of carbon and molten salts in a side wall. To promote discharging of carbon through this outlet (14), the reactor preferably has collecting means such as a skimmer for skimming produced carbon. It is highly preferred that a reactor according to the invention has a skimmer, as this allows the convenient discharging of a mixture of salt and produced carbon.

Such a mixture can be passed through separation means (15) such as a filter, which is preferably present in the reactor according to the invention. Filters have been described elsewhere herein. After separation the permeate, separated salt, can be conveyed via a recycle (16) into a salt vessel (17), both of which are preferably present in the reactor according to the invention, and back into the reactor (5) via an inlet (18) for replenishing the molten salt layer, which is preferably present in the reactor according to the invention. As described earlier herein, it is convenient when the salt layer is continuously replenished, as the method according to the invention is preferably a continuous method. When salt is collected during collection of produced carbon, the salt layer depletes. Replenishment ensures that the process can be continuously performed. This salt vessel is convenient for storage of salt that has been recovered via separation means (15), or via separations means (21).

Carbon, or a mixture of carbon and salt, is retained by separation means (15). Often a mixture of carbon and salt is retained. This mixture can be further treated in a washing vessel (20), which is preferably present in the reactor according to the invention, to which it is optionally transported via a pump (19). The washing vessel is supplied by a stream of aqueous solution (26) which for example supplies water. Suitable aqueous solutions have been described elsewhere herein. In the washing vessel salt is dissolved and solid carbon is suspended or precipitates. The suspension comprising water, salt, and carbon can then be separated using separation means (21) such as a filter, which is preferably present in the reactor according to the invention.

Separated carbon is optionally dried using drying means (22), which is preferably present in the reactor according to the invention, after which pure solid carbon (23) is obtained. Aqueous solution comprising salt obtained via separation means (21) can be dried using drying means (24), which is preferably present in the reactor according to the invention after which the salt can be transported back to a salt vessel (17) optionally using a pump (25). The drying means can be any drying means known in the art, for example an oven or a heated conveyor belt.

A highly preferred reactor according to the invention is a reactor as depicted in FIG. 2.

Uses

In another aspect, the invention provides a combination of molten metal and molten salt, for use in the molten metal pyrolysis of hydrocarbons. The metal and the salt are defined in more detail above. The combination typically is present in a pyrolysis reactor as described in step (i) of the method according to the invention, preferably in a reactor according to the invention.

In another aspect, the invention provides the use of molten salt for the separation of solid carbon from a molten metal. As described for the method according to the invention, molten salt can be used to separate solid carbon from a molten metal. In preferred embodiments, the molten salt is used as an extracting medium to extract solid carbon from a molten metal. The molten salt is preferably as described elsewhere herein. The solid carbon is preferably as described elsewhere herein. The molten metal is preferably a molten metal catalyst and the separation is preferably in the context of molten metal pyrolysis of hydrocarbons. The use is preferably in a reactor as described elsewhere herein. In preferred embodiments this use is to protect a molten metal catalyst.

General Definitions

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one". The word "about" or "approximately" when used in association with a numerical value (e.g. about 10) preferably means that the value may be the given value more or less 1% of the value.

The present invention has been described above with reference to a number of exemplary embodiments. Modifications and alternative implementations of some parts or elements are possible, and are included in the scope of protection as defined in the appended claims. All citations of literature and patent documents are hereby incorporated by reference.

EXAMPLES

Example 1—Molten Metal Hydrolysis of a Hydrocarbon Stream

Figure 1:
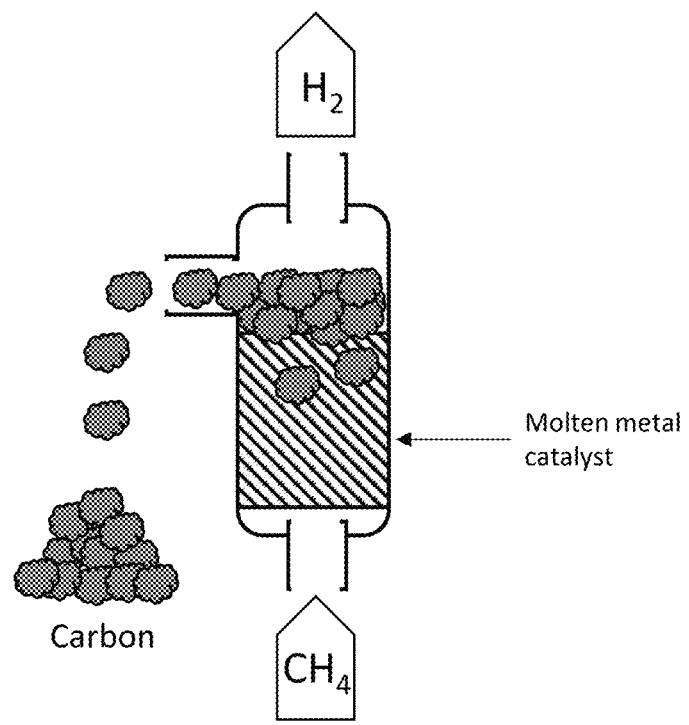
FIG. 1 (A) State of the art reactor for hydrocarbon conversion, drawn here as $CH_4$, to $H_2$ and carbon. The hydrocarbon is bubbled through a layer of molten metal catalyst (hatched) after which gaseous $H_2$ product evolves from the reactor. Solid carbon product as a lower density than the molten metal and accumulates at the top, where it can be collected. Carbon that is not collected can clog the reactor. Collected carbon is easily contaminated with metal. (B) Use of molten salt in a method according to the invention. The molten salt separates the produced solid carbon from the molten metal, preventing accumulation of solid carbon on the catalyst. Collected carbon is not contaminated with metal, while any potential residual salt can be conveniently washed away.
Figure 1:
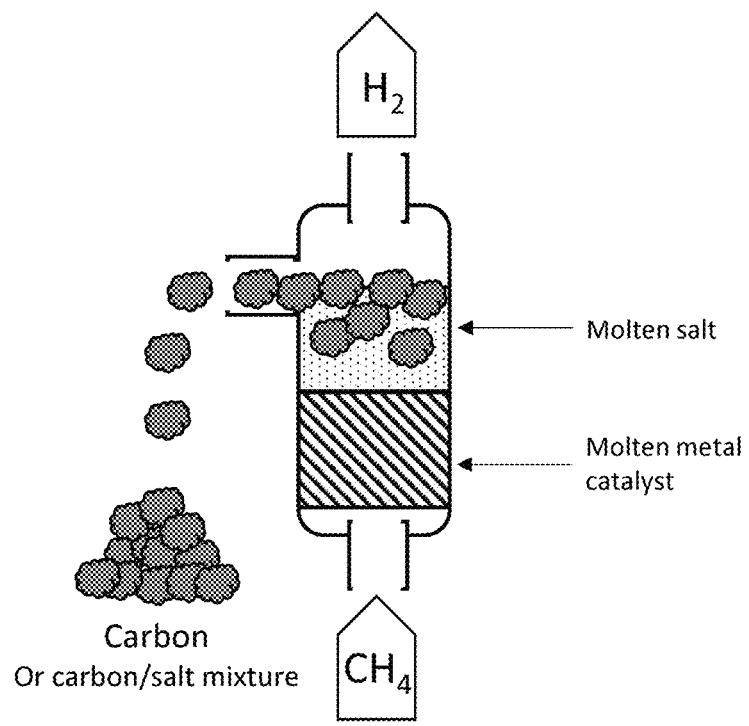
Figure 2:
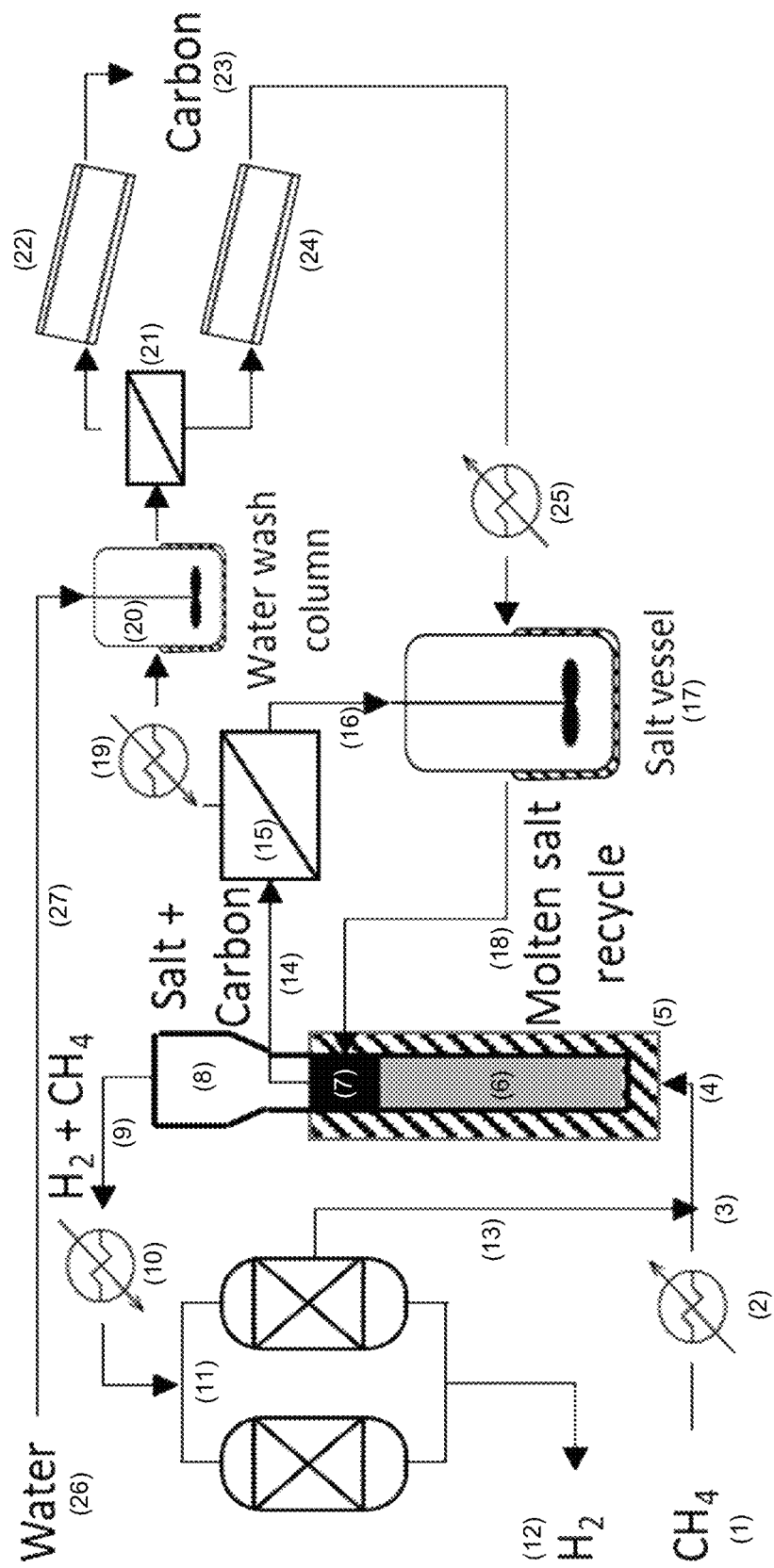
FIG. 2: Preferred reactor for continuous process for production of carbon and $H_2$ from hydrocarbon, depicted here as $CH_4$, using molten salt. A stream of hydrocarbon (1) is fed, optionally using a pump compressor (2), towards an inlet (4) for receiving the hydrocarbon at the bottom of a pyrolysis reactor (5). During operation, a layer of molten metal catalyst (6) and a layer of molten salt (7) are present in the reactor (5). Produced hydrogen gas evolves from the molten layers and can collect in a headspace (8), along with possible unconverted hydrocarbon gas. The product mixture can be collected via an outlet (9) for discharging a product gas comprising hydrogen at the top end of the reactor (5), after which it can be transport with an optional pump compressor (10) towards means (11) for separating pure hydrogen gas (12) from unconverted hydrocarbon gas (13). The recovered hydrocarbon gas can be fed into the original stream of hydrocarbon (1) for instance at a junction (3) before the stream enters the reactor (5). The reactor preferably has an outlet (14) for discharging a mixture of carbon and molten salts in a side wall, which can be passed through separation means (15) such as a filter, after which separated salt can be conveyed via a recycle (16) into a salt vessel (17) and back into the reactor (5) via an inlet (18) for replenishing the molten salt layer. Carbon, or a mixture of carbon and salt, can be further treated in a washing vessel (20) to which it is optionally transported via a pump (19). The washing vessel is supplied by a stream of aqueous solution (26) after which the suspension comprising water, salt, and carbon is separated using separation means (21) such as a filter. Separated carbon is optionally dried using drying means (22) after which pure solid carbon (23) is obtained. Aqueous solution comprising salt obtained via separation means (21) can be dried using drying means (24) after which the salt can be transported back to a salt vessel (17) optionally using a pump (25).

Conventional molten metal pyrolysis employs a setup as depicted in FIG. 1A. The method of the invention is depicted in FIG. 1B, which uses a reactor wherein liquid salt is present. Natural gas (NG) is fed to the molten metal bubbling column reactor in which the methane pyrolyzes into C and $H_2$. The $H_2$ and un-converted $CH_4$ is passed through a pressure swing adsorption (PSA) unit to separate high purity $H_2$. Unconverted $CH_4$ is recycled back to the natural gas input. The bubbling column reactor consists of two liquid layers, separated by density differences. The bottom layer is the molten metal, which catalysis the pyrolysis reaction. Floating on top is the molten salt layer. The produced carbon, due to a significant density difference with the molten metal layer, floats through the molten metal into a molten salt layer (assisted by the produced hydrogen and unconverted hydrocarbon gas bubbles). The molten salt works as a washing solution for the carbon particles. The skimmed off solid carbon/molten salt slurry which is formed in the reactor is further separated with the help of a filter. The filtered carbon can be subsequently washed with water to remove traces of the salt, dried, and collected and sent to carbon storage. The salt stream is recycled back to the molten metal reactor to collect new carbon formed.

Example 2—Separation of Carbon from Molten Metal and Molten Salt

The following procedure was followed:

1. A predefined amount (see table below) of starting mixture comprising metal (gallium), carbon (carbon black with a particle size of at most 100 μm), and salt (a 1:1 by weight mixture of $NaNO_3$ and $KNO_3$) were added to a glass test-tube. Carbon was placed at the bottom and metal at the top.
2. The test tube was heated to 350° C. in an electric oven in two configurations, (a) without bubbling, and (b) with bubbling. The bubbling was induced by an immersed steel tube to replicate conditions during molten metal pyrolysis, where a hydrocarbon stream is bubbled through the molten system.
3. The mixture was maintained in the above defined conditions for 15 minutes up to eight hours. The results shown in table 1 represent samples after 15 minutes.
4. After the duration of predefined time (here 15 minutes) the test tube was taken out of the oven and allowed to cool down. Liquid layers solidified.
5. After cooling down, the carbon (in powered state) was retrieved from the top. The molten metal was taken from the bottom by breaking the test tube. The salt (solid) with carbon embedded in it and was taken from the middle of the test tube.
6. Some salt got stuck to fragments of the broken test tube. This salt was retrieved by washing the fragments in water and collecting the water. This water was added to the mixture of salt and carbon. Any fragments of glass were decanted from the solution, and the carbon was then filtered out and combined with the collected carbon, which was subsequently dried.
7. Water was evaporated to provide the initial salt.

The table below shows the measured mass of carbon, salt and metal (in grams) before and after the separation tests. In the beginning, there are distinct layers of carbon, salt and metal in the test-tube. At high temperature, the layers were reordered by density of the material, and after the test, the separate layers were collected. It was found that almost all of the carbon is separated from the metal, but the collected carbon and salt samples have cross-contamination, which is resolved by washing of the carbon.

| Material | Start mixture | Separated mixture | Recovery (%) * |
|---|---|---|---|
| Without bubbling | | | |
| Salt | 2.91 | 2.86 | 98 |
| Carbon | 0.52 | 0.48 | 92 |
| Molten metal | 8.6 | 8.6 | 100 |
| With $N_2$ bubbling | | | |
| Salt | 3.45 | 3.21 | 93 |
| Carbon | 0.67 | 0.64 | 96 |
| Molten metal | 17.2 | 17.2 | 100 |

Recovery percentages are determined as follows: Salt is recovered from the salt layer (determined after removal of the carbon), carbon is recovered from the carbon layer and the salt layer (determined after removal of the salt), and metal is recovered from the molten metal layer. Thus, carbon was efficiently separated from the molten metal and recovered from the carbon and salt layers with high yields of over 90%. Residual salt was readily rinsed away and no contamination with molten metal was observed.

The invention claimed is:

1. Method for producing solid carbon and hydrogen gas by molten metal pyrolysis of hydrocarbons, the method comprising:
   (i) feeding a stream of hydrocarbon into a pyrolysis reactor through a catalytic layer of molten metal to pyrolise the hydrocarbon into solid carbon and hydrogen gas;
   (ii) feeding a stream of molten salt into the pyrolysis reactor to separate the solid carbon from the molten metal
   (iii) collecting a product gas containing hydrogen gas that evolves from the reactor;
   (iv) collecting a mixture comprising solid carbon and molten salt;
   (v) separating the mixture obtained in step (iv) into a product comprising solid carbon and separated salt
   wherein the separation step (v) involves separating solid carbon from the separated salt by filtering and/or washing the mixture with an aqueous liquid to obtain a product comprising pure solid carbon and a separated salt, and wherein the separated salt is recycled into the reactor as part of step (ii).

2. The method according to claim 1, wherein the metal in the molten metal is selected from the group consisting of In, Bi, Sn, Ga, Pb, Ag, Cu, Pt, Ni, and Au.

3. The method according to claim 1, wherein the salt has a heat capacity of at most 2 J/K, and/or wherein the salt comprises at least one of $KNO_3$, $NaNO_3$, NaCl, KCl, LiCl, $MgCl_2$, CuCl, $NiCl_2$, $ZnCl_2$, $ZnBr_2$ and NaBr.

4. The method according to claim 1, wherein the hydrocarbon comprises a C1-C4 hydrocarbon.

5. The method according to claim 1, further comprising:
   (vi) separating the product gas obtained in step (iii) into unconverted hydrocarbon gas and hydrogen gas, to obtain purified hydrogen gas and recovered hydrocarbon.

6. The method according to claim 5, wherein the recovered hydrocarbon is recycled back into the pyrolysis reactor as part of step (i).

7. The method according to claim 1, wherein the reactor has an inlet for receiving the hydrocarbon at or near the bottom end of the reactor, an outlet for discharging a mixture of carbon and molten salts in a side wall, and an outlet for discharging a product gas comprising hydrogen at or near the top end.

8. The method according to claim 1, wherein a layer of molten salt is present in the pyrolysis reactor, and wherein step (iv) involves skimming to collect the solid carbon and part the layer of molten salt, such that substantially all of the solid carbon is removed from the reactor.

9. The method according to claim 1, wherein separating solid carbon from the separated salt by filtering is done by using a metal filter or a ceramic filter.

10. The method according to claim 1, wherein the reactor is kept at a temperature in the range of 250-1500° C.

11. The method according to claim 4, wherein the hydrocarbon is methane.

12. The method according to claim 5, wherein separating the product gas obtained in step (iii) into unconverted hydrocarbon gas and hydrogen gas is done by using an adsorbent material.

\* \* \* \* \*